United States Patent [19]

Kraushaar et al.

[11] 4,317,751

[45] Mar. 2, 1982

[54] THALLIUM DOPED POTASSIUM IODIDE FILTER

[75] Inventors: Robert J. Kraushaar, Tenafly, N.J.; Kevin B. Ward, Bayside, N.Y.

[73] Assignee: International Telephone and Telegraph Corporation, New York, N.Y.

[21] Appl. No.: 163,375

[22] Filed: Jun. 26, 1980

[51] Int. Cl.³ .......................... F21V 9/12; G02B 5/20
[52] U.S. Cl. .................................. 252/582; 252/584; 252/587; 350/312
[58] Field of Search .................... 252/582, 584, 587; 350/312

[56] References Cited

U.S. PATENT DOCUMENTS 2,128,110  8/1938  Wilson ................................ 350/312
3,801,179  4/1974  Wisse et al. ....................... 350/312

OTHER PUBLICATIONS

Bruga et al., "Band Pass Filter for the 2537 A Mercury Line", J. Sci. Instrum., 1966, vol. 43, pp. 341–342.

*Primary Examiner*—Natalie Trousof
*Assistant Examiner*—Frederick W. Pepper
*Attorney, Agent, or Firm*—John T. O'Halloran; Peter C. Van Der Sluys

[57] ABSTRACT

An ultraviolet optical filter is provided having a first filter element including a 2,7-dimethyl-diaza-(3,6)-cycloheptadien-(1,6)-perchlorate and second filter element including a crystal of thallium doped potassium iodide. A method for filtering light is also disclosed.

14 Claims, 2 Drawing Figures

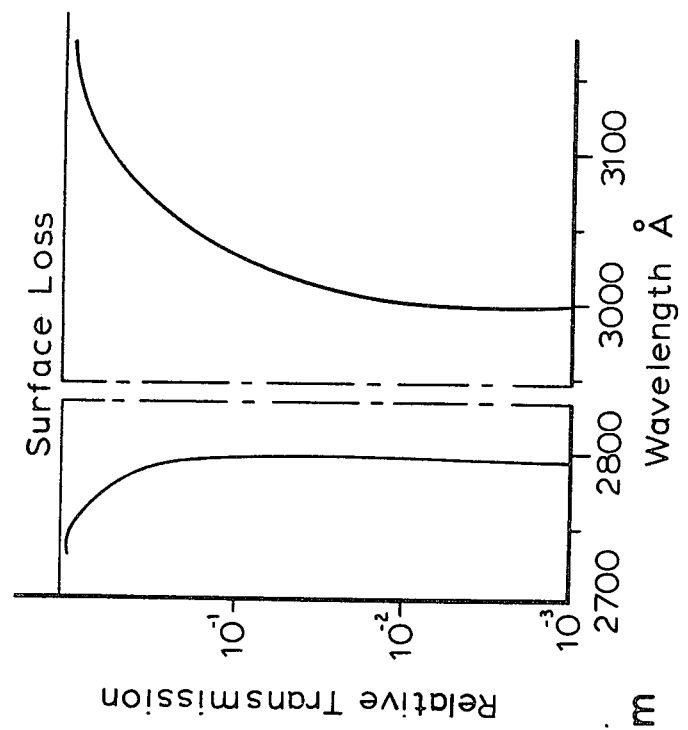
FIG. 2 Transmission for 3 mm. thick sample of thallium doped KI.

THALLIUM DOPED POTASSIUM IODIDE FILTER

BACKGROUND OF THE INVENTION

The field of the invention relates to optical filters such as solar blind filters, and more particularly to the use of a thallium doped potassium iodide element within a "Barr filter".

A Barr filter is a solid type of band pass filter which includes a suspension of 2,7-dimethyl-diaza-(3,6)-cycloheptadien-(1,6)-perchlorate in a thin film of polyvinyl alcohol.

This suspended compound is referred to in the art as "cation X" and is well known; see Schwarzenbach, Lutz, Helvetia Chima Acta 23, 1139, 1144 (1940).

Previous solar bind filters relied upon the combined effects of several elements to provide definition of the solar blind transmission edge at about 0.28–0.285 microns. The need to use several elements resulted in considerably lower overall in-band filter transmission.

SUMMARY OF THE INVENTION

The ability to positively define the transmission edge of the solar blind region allows other filter elements to be recombined and/or substituted to provide higher in-band transmission. In accordance with the invention, the use of a thallium doped potassium iodide (KI:Tl) element is a principal reason for achieving a threefold increase in transmission between 0.25 and 0.28 microns while also maintaining a lower solar background count than previously demonstrated in multi-element solar blind filters.

By utilizing a combination of cation X and KI:Tl within a Barr filter such as described in my copending application Ser. No. 125,431 filed Feb. 28, 1980, a sharp cut-off edge will be provided. In this copending application, the cation X is dissolved in glycerol rather than suspended in polyvinyl alcohol. The sharp cut-off edge results from a narrow absorption band so situated in the ultraviolet spectrum relative to the cation X that it can act to sharpen the significant absorption edge of the cation X filter element to eliminate the residual spectral contribution of the sun even under the most stringent low ozone conditions.

A method of filtering light to selectively transmit ultraviolet is also provided wherein a thallium doped potassium iodide filter element and an element including cation X are inserted in a path of light.

BRIEF DESCRIPTION OF THE DRAWINGS

FIG. 2 is a graphical representation of the relative transmission of a KI:Tl sample.

DETAILED DESCRIPTION OF THE INVENTION

Figure 1:
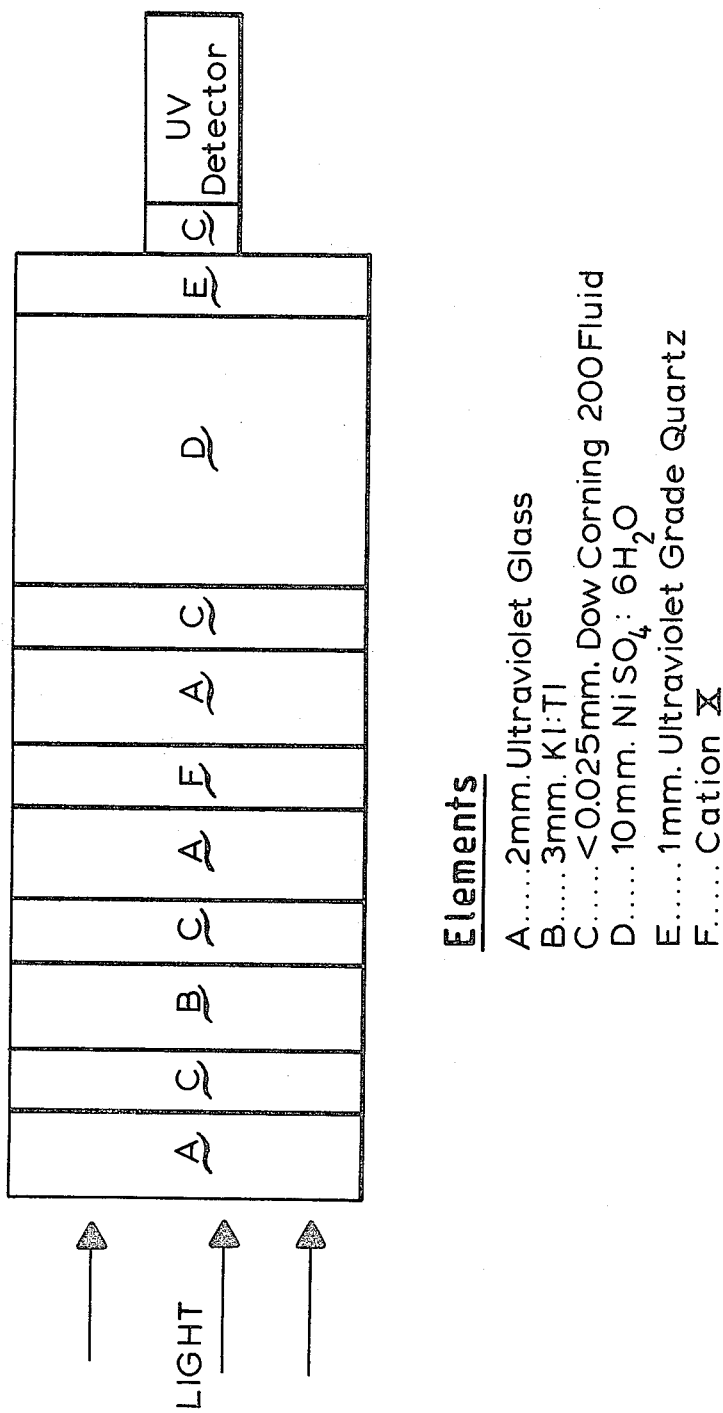
FIG. 1 is a schematic illustration of an optical filter.

A number of studies have been made with respect to the transmission characteristics of thallium doped potassium iodide (KI:Tl) phosphors. Articles in the field include "Emission Spectra of KCl:Tl, KBr:Tl, KI:Tl at 300,80 and 12° Kelvin", Edgerton, Teegarden, Phys. Rev., Vol. 129, No. 1, p. 169 (1963) and "Color Centers in KI Containing Impurity Electron Acceptors:KI:Tl", Hersh, J. Chem. Phys. Vol. 30, No. 3, p. 790 (1959). The first mentioned article indicates that at room temperature (i.e., 300° K.), the phosphors would interfere with a detector if used alone. They would produce their own signal and interfere with the one which is intended to be transmitted.

Tests performed upon a 3 mm thick sample of KI:Tl resulted in a transmission curve shown in FIG. 2. The graph shows both a high transmission in the region of interest and a sharp cut-off edge between 2760 Å and 2790 Å. This edge results in an ideal long wavelength limit for definition of a solar blind region. The slope of the edge is so sharp that by 2820 Å, the transmission is reduced by approximately nine orders of magnitude. The sample utilized was about $10^{-1}$ mole percent thallium.

The invention is directed to an ultraviolet optical filter comprising a thallium doped potassium iodide element and a suspension of cation X. An example of such a filter is shown in FIG. 1 in combination with a UV detector.

The end of the filter assembly which is exposed to light includes an ultraviolet glass section A having a thickness of about 2 mm. It serves to filter wavelengths which are not in the ultraviolet range. UG-5 glass, such as manufactured by Schott, has been found to be acceptable in practice.

The first element B within the filter assembly is a single crystal of thallium doped potassium iodide. The element is about 3 mm in thickness and is positioned between the ultraviolet glass described above and a second ultraviolet glass A as shown in the drawing. Dow Corning 200 fluid C is used as the coupling fluid of the KI:Tl crystal to the continuous filter element surfaces. This is used rather than glycerol as the latter would tend to absorb water, thereby destroying the crystalline structure. The fluid C keeps surface reflection losses to a minimum and gives the hygroscopic crystal a protective coat against atmospheric moisture. Dow Corning 200 fluid is a silicon fluid having the advantageous properties of being highly transparent in the ultraviolet range and resists breaking down under operating conditions.

A glass cell is defined by the ultraviolet glasses A to the right of the KI:Tl crystal shown in FIG. 1. Cation X in solution is contained in this cell. The cation X is designated in the drawing as element F. The second and third ultraviolet glasses A are both about 2 mm in thickness.

A single crystal of $NiSO_4:6H_2O$ is coupled to the third ultraviolet glass by means of Dow Corning 200 fluid C. This fluid layer is less than about 0.025 mm in thickness as are the layers C discussed above. The kinematic viscosity of the fluid is about 300,000 centistokes. The $NiSO_4:6H_2O$ crystal is about 10 mm in thickness. The use of $NiSO_4:6H_2O$ crystals in filters is generally known, and the growth of such filters is well documented. See, for example, Holder, A. and Singer, P., *Crystals and Crystal Growing*, Anchor Books, Doubleday and Company, Inc., Garden City, New York. 1960, pages 112–114.

A 1 mm thick element E of ultraviolet grade quartz is provided to the right of the $NiSO_4:6H_2O$ crystal shown in FIG. 1. The element E utilized may be that sold under the tradename "Suprasil" which is available from Englehard Industries of Hillside, New Jersey. A layer of Dow Corning 200 fluid couples the ultraviolet grade quartz to a UV detector.

The KI:Tl crystal is between $10^{-1}$ and $10^{-2}$ mole percent thallium (known in the art as Type II). When used in combination with the cation X in the arrangement described above, the phosphor will not interfere with the signal to be transmitted. The narrow absorption band is so situated in the ultraviolet spectrum relative to the cation X filter element to eliminate the residual spectral contribution of the sun.

This function is performed even under the lowest occurring ozone conditions. FIG. 2 illustrates the efficacy of the KI:Tl crystal in the case of a 3 mm thick sample described above.

It will be appreciated by those skilled in the art that modifications can be made in the structure described above without materially departing from the spirit of the invention. Element D may be made from materials other than $NiSO_4:6H_2O$ and the coupling fluid may be varied. The scope of the invention should accordingly be determined by reference to the appended claims.

What is claimed is:

1. An optical filter comprising a first filter element including thallium doped potassium iodide and a second filter element including 2,7-dimethyl-diaza-(3,6)-cycloheptadien-(1,6)-perchlorate.

2. A filter as described in claim 1 wherein said first filter element is between $10^{-1}$ and $10^{-2}$ mole percent thallium.

3. A filter as described in claim 2 wherein said first filter element is about 3 mm in thickness.

4. A filter as described in claim 2 wherein said first filter element is positioned within a coupling fluid capable of protecting said first filter element from atmospheric moisture and reducing surface losses.

5. A filter as described in claim 1 wherein said 2,7-dimethyl-diaza-(3,6)-cycloheptadien-(1,6)-perchlorate is dissolved in glycerol.

6. A filter as described in claim 1 wherein said first filter element is positioned between filter sections of ultraviolet glass, said second filter element being in liquid form and contained within an ultraviolet glass cell.

7. A filter as described in claim 6 further including a nickel sulfate hexahydrate element positioned such that light may pass through said first filter element, said second filter element, and said nickel sulfate hexahydrate element, respectively.

8. A filter as described in claims 1, 2 or 3 wherein said first filter element is a single crystal of thallium doped potassium iodide.

9. A method of filtering light to selectively transmit ultraviolet, which comprises: inserting in the path of said light a filter including a thallium doped potassium iodide filter element and another filter element including 2,7 dimethyl-diaza-(3,6)-cycloheptadien-(1,6)-perchlorate.

10. A method as described in claim 9 wherein said thallium doped potassium iodide filter element is between $10^{-1}$ and $10^{-2}$ mole percent thallium.

11. A method as described in claim 10 wherein said 2,7 dimethyl-diaza-(3,6)-cycloheptadien-(1,6)-perchlorate is dissolved in glycerol.

12. A method as described in claim 10 wherein said thallium doped potassium iodide element is a single crystal of potassium iodide.

13. A method as described in claim 9 wherein said thallium doped potassium iodide element is positioned between filter sections of ultraviolet glass, said other filter element being in liquid form and contained within an ultraviolet glass cell.

14. A method as described in claim 9 or claim 13 further including the step of providing a filter element comprising nickel sulfate hexahydrate within said filter such that light passes through said thallium doped potassium iodide filter element, said 2,7 dimethyl-diaza-(3,6)-cycloheptadien-(1,6)-perchlorate filter element, and said nickel sulfate hexahydrate filter element, respectively.

* * * * *